United States Patent [19]

Weston et al.

[11] 4,324,682

[45] Apr. 13, 1982

[54] ENCAPSULATED FLUORESCENT COMPOSITION

[75] Inventors: Norma A. Weston, Annandale; Edward J. Schurdak, Somerville, both of N.J.

[73] Assignee: American Cyanamid Company, Stamford, Conn.

[21] Appl. No.: 371,424

[22] Filed: Jun. 18, 1973

Related U.S. Application Data

[63] Continuation of Ser. No. 178,529, Dec. 18, 1970, abandoned.

[51] Int. Cl.$^3$ .............................................. C09K 11/06
[52] U.S. Cl. .............................. 252/301.27; 427/157; 250/462
[58] Field of Search ................. 252/301.2 R, 301.3 R, 252/188.3, 408, 301.27; 117/1, 3, 159; 250/72, 462; 427/157

[56] References Cited

U.S. PATENT DOCUMENTS 3,515,070  6/1970  Cutler et al. ................. 252/301.2 R
3,740,402  6/1973  Cevasco ....................... 252/301.2 X

*Primary Examiner*—Stephen J. Lechert, Jr.
*Attorney, Agent, or Firm*—Frank M. Van Riet

[57] ABSTRACT

This invention relates to compositions of matter useful for marking and identification purposes comprising a continuous, pressure rupturable coating containing (1) a fluorescent material and (2) a water-insoluble, volatile, hydrocarbon solvent and a method of marking and identifying objects therewith.

9 Claims, No Drawings

ENCAPSULATED FLUORESCENT COMPOSITION

CROSS-REFERENCE TO RELATED APPLICATION

This application is a continuation of our abandoned application, Ser. No. 178,529, filed Dec. 18, 1970 and entitled COMPOSITIONS.

BACKGROUND OF THE INVENTION

One of the basic problems which has plagued military personnel over the years has to do with the identification and tracking of objects. This problem relates not only to personnel but also to equipment such as trucks, boats, etc. That is to say, there are many areas where either public order or the national security are threatened by intrusion on the ground by personnel. Therefore, a system of detection whereby it is possible to determine when and where an intrusion of a given area has occurred has become necessary. Additionally, a system whereby the intruder can be tracked to determine the direction in which he moved, would solve a further need.

SUMMARY

We have now discovered a class of compositions which may be strewn across a given area for purposes of identification and detection of insurgents who illegally invade said area. Our compositions are featured by their excellent transfer and retransfer capabilities. They have exceptional properties for use on all types of soil, sand etc. Since they exist as capsules, when the capsule is broken by the foot or shoe of an intruder, the contents transfer to the shoe and then retransfer to the ground as he walks. Subsequently, the retransferred material can be detected by an electronic monitor which emits a signal. The monitoring can be conducted either from the ground or the air. As a result, it can be determined where an intrusion has occurred and forces can be rapidly concentrated to apprehend the intruder.

Prior art systems such as non-wettable powders and oils, fail to meet accepted military requirements, as do conventional dyes such as those used to trace the flow of rivers or mark the location of survivors of maritime disasters. The non-wettable powders are easily removed, while the oils tend to penetrate too deeply into porous objects and therefore become undetectable. The dyes are too easily visible by the human eye and therefore objects marked therewith can be easily avoided. Types of available marking compositions are taught in U.S. Pat. Nos. 3,162,642 and 3,066,105.

DESCRIPTION OF THE INVENTION INCLUDING PREFERRED EMBODIMENTS

As mentioned above, our novel compositions comprise a continuous, pressure rupturable coating containing (1) a fluorescent material and (2) a water-insoluble, volatile hydrocarbon solvent.

Examples of suitable water-insoluble, volatile hydrocarbon solvents useful in the compositions of our invention include those having a high vapor pressure such as the aromatic hydrocarbons, e.g. xylene, toluene, benzene, etc., naphtha, paint thinner and the like. The solvents should be used in concentrations ranging from about 50% to about 95%, by weight, preferably from about 50-90%, by weight, based on the total weight of the encapsulated composition.

The fluorescent material used in our compositions can consist of any material or combination of materials which can be activated by ultraviolet light and which emit in the visible (are colored in the visible region). The fluorescent material is preferably soluble in the solvent but may also be utilized as a suspension therein. Examples of suitable fluorescers include the benzothiazoles, (U.S. Pat. Nos. 3,049,509; 2,985,661) e.g. 2-(2-hydroxy-5-chlorophenyl)-benzothiazole; 2-(2-hydroxy-3-methoxyphenyl)-benzothiazole; 2-phenyl-5-methyl-6-methoxy benzothiazole; 2-(2-aminophenyl)-benzothiazole; 2,2'-bis-benzothiazole; 2-benzimido-6-methoxy-3-methyl benzothiazole; 2-(p-acetamidophenyl)-6-methylbenzothiazole, etc.; the quinones (U.S. Pat. Nos. 3,169,129; 3,269,955; 3,526,627) e.g. 2-(2-hydroxy-3,5-dichlorophenyl)-4(3)-quinazolone; 2-(4-methoxyphenyl)-4(3)-quinazolone; 6-methoxy-2-phenyl-4(3)-quinazolone; 6-butyl-2-(4-methoxyphenyl)-4(3)-quinazolone; 2-(3-hydroxy-2-naphthyl)-quinazolone; 1,2-dihydro-2-(o-methoxyphenyl)-quinazolone; 2-(2-hydroxyphenyl)-quinazolone ethyl carbonate; 2-styril quinazolone; 2-(2-hydroxy-3-nitrophenyl)-4(3)-quinazolone; 2-[2-hydroxy-5-(azophenyl)phenyl]-4(3)-quinazolone, etc.; 4-methyl-7-dimethylamino coumarin (U.S. Pat. No. 2,844,539); the oxazoles, e.g. 2-(1-naphthyl)-5-phenyl oxazole (U.S. Pat. No. 2,985,661); the benzimidazoles, (U.S. Pat. No. 2,985,661) e.g. 2-(2-hydroxyphenyl)-benzimidazole; 2-phenylbenzimidazole; 2-(2-aminophenyl)-benzimidazole; etc.; the hydrazines e.g. disalicyloylhydrazine; 1-salicyloyl 2-(4-methoxy salicyloyl)hydrazine; 1,2-bis-(3,5-dichloro salicyloyl)hydrazine, etc., also such classes of compounds represented by such compounds as 1,8-dihydroxyanthraquinone; 4,5-diphenylimidazolone; 2-(o-hydroxyphenyl)benzoxazole (U.S. Pat. No. 2,985,661); N,N"-bis-(salicylideneamino)oxamidene (U.S. Pat. No. 3,149,092); p-methoxyphenyl hydrazone; 1-cyanoformimidic acid; alphamethyl-o-hydroxy-benzylidenehydrazide (U.S. Pat. No. 3,149,092); 6-hydroxynicotinic acid; salicylaldehyde semi-carbazone; 2-aminobiphenyl; 2-phenylbenzoxazole (U.S. Pat. No. 2,985,661); bis(8-hydroxyquinolino)Zn II, and the like.

The fluorescent material can consist of any material or mixtures of materials, in amounts ranging from about 5% to about 50%, preferably about 10% to 50%, by weight, based on the total weight of the final encapsulated composition.

The materials used to form the continuous, pressure rupturable coatings or capsules in which the solvent-fluorescer composition is located are well known to those skilled in the art. Examples of suitable materials for this purpose include animal gelatin such as pigskin gelatin, albumin, casein, agar-agar, starch, pectin, gum arabic, ethyl cellulose, Irish moss, ethyl-$\beta$-hydroxyethyl cellulose, vinyl pyrrolidone-vinyl acetate copolymers, vinyl chloride-vinyl acetate copolymers, sodium alginate solutions and the like. The capsules can be prepared according to U.S. Pat. Nos. 2,730,457; 2,800,457; 2,800,458; 3,015,128; 3,310,612; 3,389,194; and 3,129,103, which patents are hereby incorporated herein by reference.

As mentioned above, our novel encapsulated compositions may be used as a detecting mechanism whereby one can readily determine an area previously covered or patrolled, etc. such as by daily aerial insecticide spraying.

Our novel compositions may be detected after application by merely contacting the object in question with ultraviolet light and examining the contacted area in the dark with the human eye.

The following examples are set forth for purposes of illustration only and are not to be construed as limitations on the instant invention except as set forth in the appended claims. All parts and percentages are by weight unless otherwise specified.

EXAMPLE 1

To a suitable apparatus similar to that described in U.S. Pat. No. 3,310,612 having 90 orifices, ⅛ inch in diameter is added a mixture comprising 50 parts of naphtha and 50 parts of a commercially available red-orange fluorescer as filler material. Sodium alginate in mixture with polyvinyl alcohol is used as the encapsulating medium, the hardening bath containing 18% aqueous calcium chloride.

The capsules recovered are about 1500 microns in diameter, spherical in shape and seamless.

EXAMPLE 2

The procedure of Example 1 is again followed except that 75 parts of naphtha and 25 parts of fluorescer are used. Similar results are achieved.

EXAMPLE 3

Again following the procedure of Example 1 except that 40 parts of fluorescer and 60 parts of naphtha are used, all other conditions remaining equal, similar results are achieved.

EXAMPLE 4

The procedure of Example 1 is again followed except that 25 parts of 2-(2-hydroxy)-3,5-dichlorophenyl-6-nitro-4-(3)-quinazolone fluorescer and 75 parts of naphtha are employed. Excellent spheres of encapsulated material are produced.

EXAMPLE 5

The procedure of Example 1 is again followed except that 25 parts of 2-(2-hydroxy-3,5-dichlorophenyl)-4-(3H)-quinazolone and 75 parts of naphtha are used. Seamless spheres of encapsulated material are recovered.

The capsules of Examples 1–5 were each placed on soil surfaces having the conditions mentioned in the table below. A human being weighing 156 pounds then walked over the capsules and continued walking for 200 feet. The number of steps that the composition from the capsules was retransferred to the soil were determined. The results are set forth in Table I, below.

TABLE I

| Composition of Example Number | No. of Steps Retransferred* | | | | |
|---|---|---|---|---|---|
| | 1 | 2 | 3 | 4 | 5 |
| 1 | 5 | 7 | 50 | — | — |
| 2 | 9 | 18 | 15 | — | 7 |
| 3 | 0 | 19 | 31 | — | 5 |
| 4 | 20 | 8 | 13 | 10 | 7 |

TABLE I-continued

| Composition of Example Number | No. of Steps Retransferred* | | | | |
|---|---|---|---|---|---|
| | 1 | 2 | 3 | 4 | 5 |
| 5 | 20 | 21 | — | 21 | 8 |

*Soil conditions:
1. Soft, dry, loose topsoil.
2. Very muddy, sandy loam and grass.
3. Mixture of muddy dirt, gravel and cinders.
4. Dry, soft, red, sandy soil.
5. Mixture of damp dirt, gravel and cinders.

EXAMPLES 6–13

Following Example 1, various other solvent-fluorescer mixtures are encapsulated utilizing a variety of encapsulating materials. The recovered capsules are subjected to the same soil tests indicated above. Each system produced an excellent product which functioned effectively as a marker-tracker device. These systems are indicated below.

6—A 50/50 mixture of paint thinner and 2-(2-hydroxy-5-chlorophenyl)-benzothiazole encapsulated in gelatin.

7—A 65/35 mixture of xylene and 6-butyl-2-(4-methoxyphenyl)-4(3)-quinazolone encapsulated in ethyl cellulose.

8—An 85/15 mixture of toluene and 2-(1-naphthyl)-5-phenyl oxazole encapsulated in agar-agar.

9—A 75/25 mixture of benzene and 2-phenylbenzimidazole encapsulated in gum arabic.

10—A 75/25 mixture of naphtha and 1,2-bis-(3,5-dichlorosalicyloyl)hydrazine encapsulated in sodium alginate.

11—A 65/35 mixture of naphtha and 2-(o-hydroxyphenyl)benzoxazole encapsulated in sodium alginate.

12—A 50/50 mixture of naphtha and p-methoxyphenyl hydrazone encapsulated in pigskin gelatin.

13—A 90/10 mixture of toluene and bis(8-hydroxyquinolino)Zn II encapsulated in a vinyl pyrrolidone-vinyl acetate (80/20) copolymer.

We claim:

1. A continuous, pressure rupturable capsule useful for marking and identification purposes, insoluble in (B) and having encapsulated therein a composition consisting essentially of (A) from about 5% to about 50% of a fluorescent material and (B) from about 50% to about 95% of a water-insoluble, volatile, hydrocarbon solvent, said percentages being by weight based on the total weight of (A) and (B).

2. A capsule according to claim 1 wherein (A) is 2-(2-hydroxy-3,5-dichlorophenyl)-4-(3H)-quinazolone.

3. A capsule according to claim 1 wherein (A) is 2-(2-hydroxyphenyl)-6-chloro-4-(3H)-quinazolone.

4. A capsule according to claim 1 wherein (B) is naphtha.

5. A capsule according to claim 2 wherein (B) is naphtha.

6. A capsule according to claim 3 wherein (B) is naphtha.

7. A capsule according to claim 1 comprising a mixture of sodium alginate and polyvinyl alcohol.

8. A capsule according to claim 1 comprising a mixture of sodium alginate and polyvinyl alcohol wherein (A) is 2-(2-hydroxy-3,5-dichlorophenyl)-4-(3H)-quinazolone and (B) is naphtha.

9. A capsule according to claim 1 comprising a mixture of sodium alginate and polyvinyl alcohol wherein (A) is 2-(2-hydroxyphenyl)-6-chloro-4-(3H)-quinazolone and (B) is naphtha.

* * * * *